June 24, 1930.　　　　E. H. McKAY　　　　1,766,445
METHOD AND APPARATUS FOR TREATING FOOD MATERIALS
Filed Aug. 30, 1928
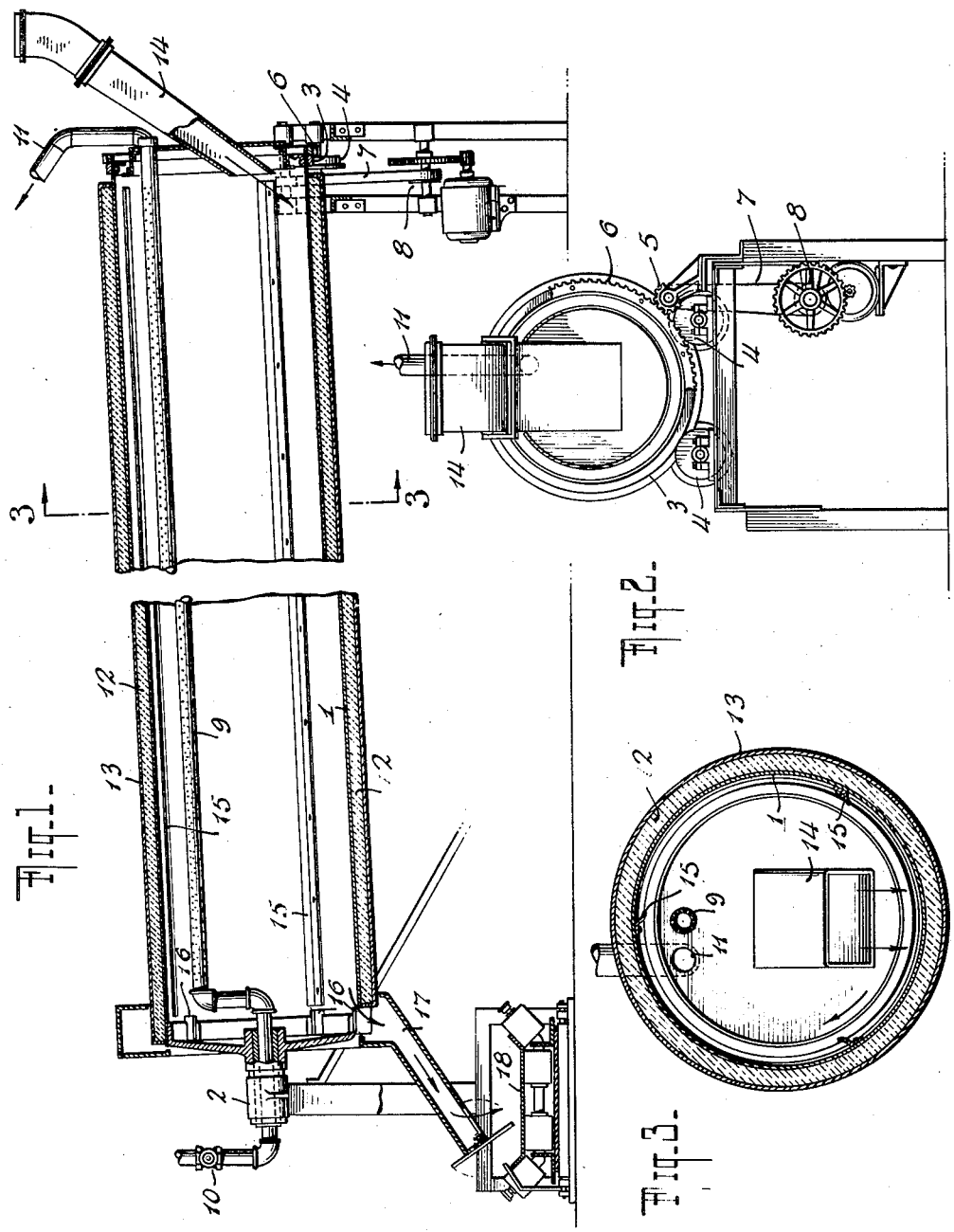
INVENTOR
EUGENE H. McKAY
Crichton Clarke
ATTORNEY Patented June 24, 1930

1,766,445

UNITED STATES PATENT OFFICE

EUGENE H. McKAY, OF BATTLE CREEK, MICHIGAN, ASSIGNOR TO KELLOGG COMPANY, OF BATTLE CREEK, MICHIGAN, A CORPORATION OF DELAWARE

METHOD AND APPARATUS FOR TREATING FOOD MATERIALS

Application filed August 30, 1928. Serial No. 303,004.

This invention pertains to certain new and useful improvements in the treatment of food and in rotary toasting, crisping, or puffing ovens suitable for carrying out the treatment or method.

It has as its object the toasting or crisping of cereal foods or other similar products in an improved fashion, wherein a more sensitive control of the process is possible, together with greater economy of operation.

The above objects are attained through the elimination of the external stationary shell common to the usual type of rotary toasting ovens. In lieu thereof, the rotating cylinder is covered with heat insulating material, and heat is provided by means of a longitudinal gas burner extending through the cylinder.

These modifications in construction permit more sensitive control of the oven, because of the smaller quantity of hot gases and construction material in the oven, thus reducing the heat retaining power of the oven and permitting more rapid changes in temperature. They further increase the thermal efficiency of the oven by reducing the area of surface exposed to the atmosphere.

In order to make clear the nature of this rotary toasting oven, reference should be made to the accompanying drawings forming part of this specification, in which like reference numerals indicate different figures:—

Figure 1 is a longitudinal section.

Figure 2 is an end elevation looking at the right hand end of Figure 1.

Figure 3 is a vertical section on the line 3—3 in Figure 1.

The oven consists of a rotary cylinder (1) mounted at the discharge end on gudgeon (2) and at the intake end on circular track (3). The circular track (3) is supported by rollers (4). The cylinder is driven by pinion (5) driving ring gear (6) which is solidly fastened to the cylinder (1). Pinion (5) may be driven by any suitable means, as by drive chain (7), which is driven by any suitable power source (8).

The oven is heated by means of gas issuing from a suitable burner (9), controlled by gas valve (10). The burner (9) is located in a stationary position within the cylinder (1), and receives its gas supply by means of a pipe leading through a central hole in gudgeon (2). Waste gases and vapors are removed through vent pipe (11). Loss of heat from cylinder (1) is prevented by suitable heat insulating material (12) which is held in place by a light sheet metal retaining cylinder (13).

In operation, the cylinder (1) is caused to revolve at a suitable speed and heat is supplied by means of gas issuing from burner (9). The material to be toasted, such as cooked, flaked, rolled, granulated, shredded or otherwise suitably prepared cereal product, is fed into the oven through the supply chute (14). The cylinder (1) is provided with longitudinal flights (15) which lift the food and cause it to be turned over, thus facilitating contact of the food with the hot gases. Since the cylinder (1) is built with a suitable slope toward the discharge end, the food travels through the cylinder toward the discharge end, finally issuing from the oven through discharge ports (16) in the end of the cylinder. The toasted food flows down the delivery chute (17) on to any suitable conveyor (18), which carries the food to its destination.

From the foregoing description of an apparatus suitable for carrying the invention into effect, it will be seen that the burner (9) serves not only to subject the food products to direct radiation of heat but it also keeps the inner wall of the cylinder (1) heated, and thereby applies indirect heat to the food products when they come in contact with said heated moving wall.

In short, the food products are treated to direct or radiant heat when they are at the bottom of the cylinder. At the same time, they receive indirect heat from their contact with the cylinder wall. Finally, they are lifted by the longitudinal flights (14) which serve to lift the food up toward the burners and then let the same drop back through the heated zone.

What is claimed as new is:

1. A method of treating food products which consists in heating a traveling surface, thereafter bringing the food products into contact with said heated surface, and simultaneously subjecting the food products to the action of radiant heat.

2. A method of treating food products which consists in supplying heat to a traveling heat conducting surface, bringing food products into contact with said heating surface as it travels and subjecting said food products to the action of radiant heat while in contact with said moving surface.

3. A method of treating food products which consists in supplying heat to a traveling heat conducting surface, bringing food products into contact with said heating surface as it travels and subjecting said food products to the action of radiant heat while in contact with said moving surface, and thereafter passing said food products through a heating zone.

4. A rotary toasting, crisping, or puffing oven comprising a revolvable cylinder provided with external heat-insulating material carried by and moving therewith, said cylinder being provided with a source of heat located internally thereof.

5. A device for toasting, crisping, or puffing food comprising an inclined rotary cylinder provided with external heat-insulating material and having a standard source of heat therein, means for removing waste gases and vapors from said cylinder and means for supplying material to and removing it from said cylinder.

6. A rotary toasting, crisping, or puffing apparatus having a traveling metal conveyor insulated on one side, means for heating said conveyor, means for thereafter supplying food products to said heating surface and simultaneously subjecting them to the action of radiant heat, and means for thereafter causing said food products to drop through a heated zone.

7. A device for toasting, crisping, or puffing food comprising an inclined rotary metal cylinder having a lining of heat insulating material and a source of heat therein, means to supply material to one end of said cylinder and to convey same to the other end for removal, and means to subject said material to direct radiation of heat in the cylinder and to indirect heat of the inner wall of the cylinder.

In testimony whereof I affix my signature.

EUGENE H. McKAY.